Oct. 1, 1968  W. K. WINKLER  3,404,258
DOMESTIC OVEN WITH SEPARATE HEAT-CLEANING COMPARTMENT
Filed Dec. 23, 1965

INVENTOR.
WILLIAM K. WINKLER
BY Richard L. Caslin
HIS ATTORNEY

United States Patent Office 3,404,258
Patented Oct. 1, 1968

3,404,258
**DOMESTIC OVEN WITH SEPARATE
HEAT-CLEANING COMPARTMENT**
William K. Winkler, Anchorage, Ky., assignor to General
Electric Company, a corporation of New York
Filed Dec. 23, 1965, Ser. No. 516,021
3 Claims. (Cl. 219—391)

ABSTRACT OF THE DISCLOSURE

In a housing comprising a cooking oven and a separate pyrolytic compartment in combination, a first heater element is disposed in the oven, a second heater element and a smoke eliminator in communication with the compartment, said second heater element having a predetermined heating rate as a function of the rate of heat loss from the compartment thereby controlling the maximum compartment temperature and eliminating the need for a compartment thermostat. The compartment is of a small size just to receive the removable panels of the oven in a stacked relationship.

---

The present invention relates to means for cleaning cooking ovens and particularly to a special apparatus for receiving removable, protective wall panels of cooking ovens so as to remove the food soils which have accumulated on the panels during normal cooking operations.

It has long been recognized that one of the most disagreeable housekeeping tasks which a housewife must undertake is that of cleaning the walls of a cooking oven of accumulated food soils. To make this task less burdensome, various oven cleaning aids and chemical compounds have come into wide use. Perhaps the most convenient of these is the special oven design utilizing a pyrolytic method of cleaning the walls of the oven by raising the temperature of a cooking oven into a heat-cleaning range somewhere between about 750° and 950° F. At these temperatures, the food soils are degraded into gaseous products which are then discharged from the cooking oven. The details of this method and of the oven design in which it may be carried out are fully disclosed and claimed in the patent of Bohdan Hurko, 3,121,158, which is assigned to the General Electric Company, the assignee of the present invention. The present invention contemplates an alternate approach to pyrolytic cleaning of ovens.

The principal object of the present invention is to provide a pyrolytic method of cleaning a plurality of removable wall panels in a special cleaning compartment.

A further object of the present invention is to provide a compact heat-cleaning apparatus for protective oven wall panels in which the heating means is regulated by a simple control system.

To fulfill these and other objects, the present invention provides a special apparatus for use in conjunction with an oven having the walls of an oven liner protected by a plurality of removable wall panels. The apparatus includes an insulated compartment having an access door which may be moved into a position in which the compartment will be completely closed. Support means within the compartment are adapted to hold one or more of the panels spaced from the walls of the compartment. A heating means elevates the temperature within the compartment to a level at which the food soils on the panels will be degraded into gaseous products.

Figure 1:
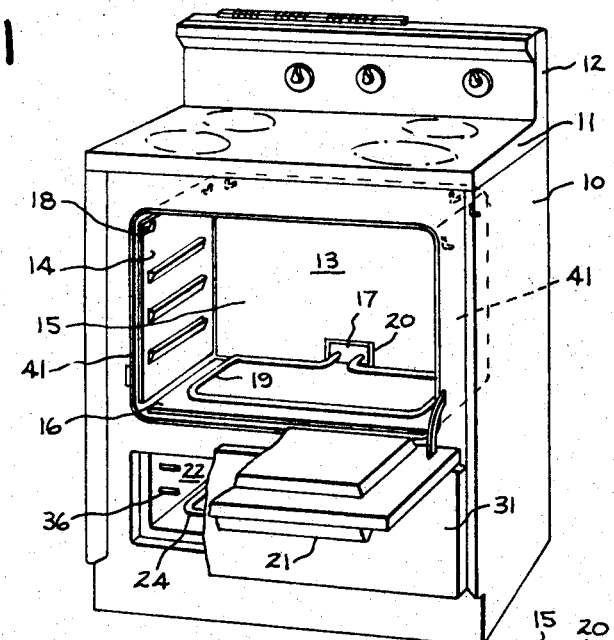
Figure 2:
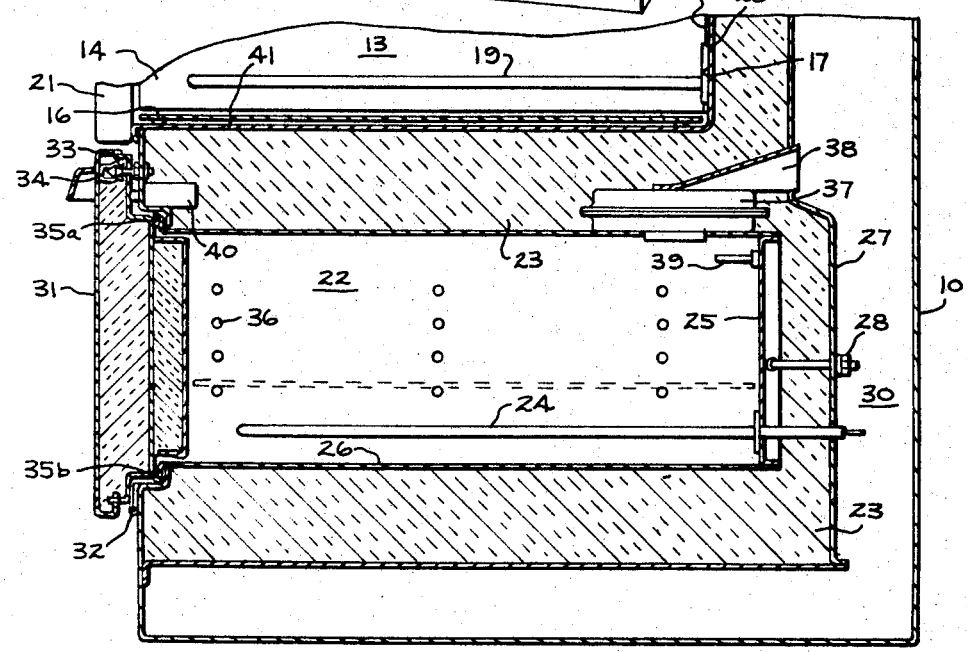

While the specification concludes with claims particularly pointing out and distinctly claiming the subject matter regarded as the present invention, it is believed that the invention together with its further objects and advantages may be better understood by reference to the following detailed description taken in conjunction with the accompanying drawing in which:

FIGURE 1 is a perspective view of a cooking range into which one embodiment of the present invention has been incorporated; and FIGURE 2 is a cross-sectional side elevational view of one embodiment of a heat-cleaning apparatus constructed in accordance with the teachings of the present invention.

Referring now to FIGURE 1, there is shown a free-standing electric range including one embodiment of the present invention. Other embodiments could be used with other types of ovens such as a gas oven, built-in wall ovens, counter-mounted ranges and the like. In fact the present invention could be built independently of any particular oven and in fact constitute a small appliance which could be operated on top of the kitchen counter. The range has an outer body or cabinet 10 with a horizontal cooktop 11 and a rear backsplash 12 upon which the range controls may be mounted. A cooking oven 13 is located directly below the cooktop and its includes a box-like oven liner 41 having a plurality of removable wall-hung panels such as opposite side panels 14, 14, back panel 15 and a bottom panel 16. The vertical panels 14, 14 and 15 may be suspended from top hooks 18 projecting inwardly from the vertical walls of the oven liner 41. An electric resistance heating element 19, to be used for cooking food placed in the oven 13, is supported from the rear wall of the oven liner 41. The back panel 15 has a notch 20 at its bottom edge for accommodating a mounting plate 17 of the bake element 19. Of course there might also be an upper heating element (not shown) adjacent the top wall of the oven liner and constituting a broil element. The oven liner cooperates with a hinged oven door 21 for forming the oven cavity 13.

A separate heat-cleaning compartment 22 is located directly beneath the baking oven 13 where the usual utensil drawer has been located heretofore. This compartment is thermally insulated by a surrounding blanket 23 of suitable heat insulating material. The compartment 22 includes a single electric resistance heating element 24 which is secured to a rear wall 25 of the compartment so as to be generally parallel to the bottom wall 26. This compartment 22 is held in place by one or more J-bolts 28 which pulls the compartment toward the back of the range as is well understood in this art. The heat-insulating material retards heat transfer from the compartment 22 to a surrounding air space 30 that lies between an intermediate cabinet wall or insulation guard 27 and the outer range cabinet 10. Heat transfer to the outside of the range is further inhibited by air circulating through the space 30.

Access to the compartment 22 is through an insulated door 31 pivoted on a hinge 32 at the bottom edge of the door. The door may be moved from a horizontal, open position to a vertical, closed position in which it is resiliently secured by a spring latch consisting of a cabinet-mounted pin 33 received in a resilient U-shaped clip 34 mounted on the door 31 near its upper edge. To retard the escape of heat, smoke and odors from around the edges of the door 31, resilient, high temperature gaskets such as 35a and 35b may be provided to seal the gap between the door edge and the walls of the range cabinet.

Each of the removable panels 14, 14, 15 and 16 can be supported within the compartment 22 on a plurality of vertically spaced horizontal rows of inwardly extending projections or pins 36. Although the removable panels are more or less stacked on one another, they are spaced vertically apart to ensure that both major surfaces of each of the panels will be heated to substantially the same temperatures during a heat-cleaning cycle. This in itself is a desirable feature since it eliminates panel warping which might otherwise cause a cracking or crazing of the porcelain enamel with which the panel is preferably coated.

An alternative would be to stack the removable panels in a vertical arrangement. This could be accomplished very easily in a forty inch free-standing range having a large Master oven provided with removable panels and a panel receiving heating compartment located to one side of the Master oven.

The heating element 24 must be capable of generating enough heat to raise and maintain the temperature in the compartment in a range between 750° F. and 950° F., in which temperature range degradation of the food soils will take place over a period of time of about one hour and a half. Since this cleaning function is the sole function of the heating element 24, the system for controlling the electric power delivered to element 24 may be quite simple. In fact, it may consist of a conventional bimetal operated infinite heat switch (not shown) which causes a predetermined constant average power to be delivered to the heating element despite variations in the input voltage. It is only necessary to match the heat loss rate of the compartment with the power to be supplied. This would be pre-determined at the factory and the housewife would merely have to turn the power on.

Since the protective panels have to be removed from the cooking oven, any excess food soil or grease spatter may be drained from the panels before the panels are stacked in the cleaning compartment 22. This avoids the possibility of having an excessive amount of volatiles within the compartment and hence prevents the creation of a fire hazard. Accordingly, it is possible to eliminate an expensive, positive door latching mechanism as used heretofore in self-cleaning ovens, in favor of the simple door catch 33, 34 illustrated in FIGURE 2.

Since the volume of the compartment 22 is quite small, it will require a minimum of time for the heating element 24 to raise the internal temperature into the heat-cleaning range. While the simplicity of the control system reduces the chances of a "run-away" heating element, this possibility must be taken into account in the event of a component failure. To prevent overheating of compartment 22 in the event that a "run-away" condition occurs, a temperature sensor 39 in compartment 22 actuates a switch (not shown) in the power supply circuit to cut off the supply of power to the heating element 24 if the temperature in the compartment exceeds a predetermined maximum level.

The food soils, after partial degradation, exist in the form of smoke or carbon monoxide vapors and it is necessary that these vapors be completely degraded into harmless products before they are exhausted from the compartment. Complete degradation takes place in a catalytic oxidizing unit 37 that is located in an oven vent opening in the top wall of an oven liner 41 as best seen in FIGURE 2. This unit 37 is preferably of the type disclosed in U.S. Patent 2,900,483, granted on August 18, 1959 to Stanley B. Welch, and assigned to the assignee of the present invention. The oxidizing unit 37 usually includes an electric heating element which can raise the temperature within the unit to a level exceeding that in the heat-cleaning compartment 22, and a wire screen or similar surface coated with a catalytic material that is adapted to promote the oxidation of carbon and carbon compounds so as to eliminate smoke, carbon monoxide, and other objectionable products produced by the partial degradation of the food soils within the compartment 22. The products resulting from the complete degradation which takes place in the oxidation unit 37 are then exhausted into the air space 30 through flue 38 on the exhaust end of the catalytic oxidation unit 37.

A door-operated switch 40 is included for the protection of the housewife. The switch permits current to flow to the heating element 24 only when the door 31 is completely closed. If the housewife attempts to open this door during a heat-cleaning cycle, the door switch 40 will open thus cutting off the flow of current to the heating element 24.

Since the oven cavity 13 is not used for a high temperature heat-cleaning operation it is possible to use conventional oven accessories such as a rotisserie, an automatic meat thermometer, an oven lamp and a window for the oven door.

While there has been described what is at present considered to be the preferred embodiment of the present invention, it will be understood that various modifications may occur to those skilled in this art. Therefore, it is intended that the appended claims shall cover all such modifications as fall within the true spirit and scope of this invention.

What I claim as new and desire to secure by Letters Patent of the United States is:

1. A cooking oven comprising in combination a boxlike oven liner and a front-opening access door, said oven liner having a bottom wall, opposite side walls, a rear wall and a top wall, a removable back panel supported from the rear wall of the oven liner, a pair of removable side panels each supported across the face of one of the opposite side walls of the oven liner, and a removable bottom panel supported on the bottom wall of the oven liner, and a first heating means for the oven for raising the oven temperature to the cooking range between about 150° F. and 550° F., a pyrolytic compartment in combination with the said cooking oven and including a boxlike liner and a front-opening door to form a closed compartment, and a second heating means for the compartment, the removable panels of the cooking oven being adapted to fit within the compartment so that the panels may be heated to a temperature above 550° F. whereby food soil and grease spatter lodged on the panels may be decomposed, and a catalytic oxidation unit for completely degrading the gaseous degradation products of the compartment, and a means for exhausting the gaseous products to the atmosphere, said second heating means having a predetermined heating rate as a function of the rate of heat loss from the compartment so as to eliminate the need for a compartment thermostatic control system whereby the maximum compartment temperature is governed automatically by the said heating rate.

2. A combined cooking oven and heat-cleaning compartment as recited in claim 1 wherein the said compartment is of a small size just to receive the said removable panels of the cooking oven in a stacked relationship.

3. A domestic appliance having a cooking oven with a box-like oven liner and a front-opening access door, a first heating means for raising the temperature of the oven to a range between about 150° F. and 550° F., the oven liner being provided with a plurality of removable wall panels for shielding the oven liner from the accumulation of food soil and grease spatter, and a pyrolytic compartment in combination with the cooking oven and having a small insulated box-like liner and a compartment door, a second heating means for raising the temperature of the compartment above about 750° F. whereby the removable panels may be stacked in close relationship in the pyrolytic compartment and the heat of the compartment will degrade the food soil and grease spatter that accumulates on the panels during the use of the panels in the cooking oven, and a catalytic oxidation unit associated with said compartment for completely degrading the gaseous products which are produced during the initial soil degradation, and exhaust means for removing the gaseous products from the compartment, the size of the compartment liner being small to restrict the compartment to the accommodation of the removable panels of the cooking oven thereby serving to limit the amount of food soil and grease spatter to be eliminated from within the compartment.

References Cited

UNITED STATES PATENTS

| | | | |
|---|---|---|---|
| 996,454 | 6/1911 | Carpenter | 219—395 |
| 2,224,945 | 12/1940 | Ames | 219—391 |
| 2,841,132 | 7/1958 | Philipp | 126—19 |
| 3,041,440 | 6/1962 | Dills | 219—391 X |
| 3,121,158 | 2/1964 | Hurko | 219—397 |

RICHARD M. WOOD, *Primary Examiner.*

C. L. ALBRITTON, *Assistant Examiner.*